(12) United States Patent
Leyendecker et al.

(10) Patent No.: US 8,060,902 B2
(45) Date of Patent: Nov. 15, 2011

(54) SYSTEM FOR RECEIVING BROADCAST DIGITAL DATA COMPRISING A MASTER DIGITAL TERMINAL, AND AT LEAST ONE SLAVE DIGITAL TERMINAL

(75) Inventors: Philippe Leyendecker, Chateaugiron (FR); Jean-Maurice Cueff, Fontenay aux Roses (FR); Daniel Creusot, Voisins le Bretonneux (FR)

(73) Assignee: Thomson Licensing, Boulogne-Billancourt (FR)

( * ) Notice: Subject to any disclaimer, the term of this patent is extended or adjusted under 35 U.S.C. 154(b) by 770 days.

(21) Appl. No.: 10/761,512

(22) Filed: Jan. 20, 2004

(65) Prior Publication Data

US 2004/0257470 A1    Dec. 23, 2004

(30) Foreign Application Priority Data

Jan. 20, 2003   (FR) .................................... 0300941
May 7, 2003    (EP) .................................... 03291099

(51) Int. Cl.
| | |
|---|---|
| *H04N 7/167* | (2006.01) |
| *H04N 7/16* | (2006.01) |
| *H04N 7/18* | (2006.01) |
| *H04N 7/00* | (2006.01) |
| *H04N 11/00* | (2006.01) |
| *H04L 29/06* | (2006.01) |
| *H04L 9/00* | (2006.01) |
| *H04L 9/08* | (2006.01) |

(52) U.S. Cl. .............. 725/31; 725/25; 725/80; 725/142; 713/158; 348/474; 348/552; 380/44; 380/279; 380/281; 380/286

(58) Field of Classification Search .................... 725/31, 725/71, 78, 80, 104, 133, 139; 713/178, 713/158, 156, 168, 171, 175; 348/474, 552; 380/277–286

See application file for complete search history.

(56) References Cited

U.S. PATENT DOCUMENTS

| | | | |
|---|---|---|---|
| 4,633,309 A | 12/1986 | Li et al. | |
| 5,748,732 A | 5/1998 | Le Berre et al. | |
| 5,861,906 A * | 1/1999 | Dunn et al. | ...................... 725/87 |

(Continued)

FOREIGN PATENT DOCUMENTS

JP    2001-313918    11/2001

OTHER PUBLICATIONS

Hitachi Ltd. et al., "5C Digital Transmission Content Protection White Paper",Jul. 14, 1998.*

*Primary Examiner* — Kristine Kincaid
*Assistant Examiner* — Omar S Parra
(74) *Attorney, Agent, or Firm* — Robert D. Shedd; Paul P. Kiel (57) ABSTRACT

The system for receiving broadcast digital data (in particular pay television services) comprises a master digital terminal (1), and at least one slave digital terminal (2) connected to the master terminal by a link (3) and able to receive protected digital data. The slave digital terminal can access the protected data only if information necessary for accessing the data and received by the master digital terminal is sent by way of link (3) to the slave digital terminal within a predetermined deadline. This information is in particular access entitlements to television services or keys for descrambling the service.

23 Claims, 7 Drawing Sheets

U.S. PATENT DOCUMENTS

| | | | |
|---|---|---|---|
| 6,904,522 B1* | 6/2005 | Benardeau et al. | 713/156 |
| 7,302,571 B2* | 11/2007 | Noble et al. | 713/172 |
| 7,797,552 B2* | 9/2010 | Kahn et al. | 713/193 |
| 2001/0037506 A1* | 11/2001 | Garfinkle | 725/60 |
| 2002/0170053 A1* | 11/2002 | Peterka et al. | 725/31 |
| 2003/0084291 A1* | 5/2003 | Yamamoto et al. | 713/168 |
| 2003/0126445 A1* | 7/2003 | Wehrenberg | 713/176 |
| 2003/0172268 A1* | 9/2003 | Walmsley et al. | 713/168 |
| 2004/0064688 A1* | 4/2004 | Jacobs | 713/150 |
| 2004/0098583 A1* | 5/2004 | Weber | 713/168 |
| 2004/0123313 A1* | 6/2004 | Koo et al. | 725/31 |
| 2005/0022227 A1* | 1/2005 | Shen et al. | 725/28 |
| 2006/0200417 A1* | 9/2006 | Stefik et al. | 705/50 |
| 2006/0212399 A1* | 9/2006 | Akiyama | 705/50 |

* cited by examiner

SYSTEM FOR RECEIVING BROADCAST DIGITAL DATA COMPRISING A MASTER DIGITAL TERMINAL, AND AT LEAST ONE SLAVE DIGITAL TERMINAL

This application claims the benefit under 35 U.S.C. §119 (a) of French patent application No. 0300941 filed Jan. 20, 2003, and European patent application No. 03291099.4 of May 7, 2003.

BACKGROUND OF THE INVENTION

1. Field of the Invention

The present invention relates to a system for receiving broadcast digital data comprising a master digital terminal, and at least one slave digital terminal connected to the master terminal.

2. Description of the Related Art

The market for digital television decoders is currently reaching a turning point. Most subscribers, in the European Countries in particular, are equipped with a single digital terminal (or <<decoder>>) per household, where as they often possess at least two television sets. There therefore exists a demand for multiple equipment in terms of decoders for one and the same household.

It will be noted that subsequently the terms <<decoder>> or <<digital terminal>> designate one and the same type of device making it possible to receive and decode (and possibly to descramble) digital signals broadcast by an operator (in particular a digital television operator). In the subsequent description use will also be made of the terms <<scramble>>/<<descramble>> or <<encipher>>/<<decipher>> to signify that an encryption/decryption algorithm is applied to data using a key.

Certain operators of pay digital television wish to offer their subscribers the possibility of equipping themselves with several digital terminals so as to benefit from their services on each of the television sets installed in their accommodation, without however making them pay the price of a full tariff subscription for the additional terminals, which would be prohibited, but rather a reduced tariff (or even a zero tariff). However, the operator has to ensure that the terminals and <<associated>> subscriptions actually remain within the same household, since in the converse case, their income is at risk of being considerably affected thereby.

A known solution consists in using the <<return path>> of the digital terminals by requesting the subscriber to link all the terminals of his home to one and the same telephone line. The operator then periodically monitors the connection of the terminals to this telephone line by remotely instructing telephone calls from the terminals to a server of the operator. However, this solution is not satisfactory since it entails the permanent connection of the digital terminals of the subscriber to a telephone line.

Another solution described in French Patent Application No. 02 09362 filed on 24 Jul. 2002 by the same applicant as the present application, THOMSON Licensing S. A., consists in guaranteeing that a physical communication link always exists between a secondary terminal (or <<slave>> terminal) and a main terminal (or <<master>> terminal) with which it is paired. The slave terminal or terminals (for which the subscriber benefits from a preferential tariff) cannot operate, that is to say provide data in clear to the television set to which they are connected, unless it is verified that the <<master>> terminal with which they are paired is present in proximity.

Several strategies for communication between these decoders are conceivable but some of them may exhibit risks of <<piracy>> or of <<circumvention>>.

SUMMARY OF THE INVENTION

The aim of the present invention is to afford an improvement to the invention described in the aforesaid patent application by minimizing the risks of piracy or of circumvention.

The principle of the invention is as follows: a <<master>> digital terminal contains a smart card in which are recorded entitlements paid for by the subscriber at the normal tariff. A <<slave>> digital terminal contains a smart card whose entitlements, identical or otherwise to those of the smart card of the <<master>> decoder, have been paid for more cheaply by the same subscriber.

This preferential tariff of the subscription of the <<slave>> decoder is granted by the operator on condition that the slave decoder is used by the same subscriber in the same accommodation as the <<master>> decoder.

The basic idea from which the invention stems consists in considering that if the <<slave>> digital terminal is not in immediate proximity to the <<master>> digital terminal, it is being used in a different accommodation and hence the subscriber is violating the contract allowing him to benefit from a preferential tariff. By virtue of the present invention, if such a situation of fraudulent use of the <<slave>> digital terminal is detected, the latter ceases to operate normally; in this instance, it no longer allows the subscriber to access all the services that he is supposed to receive (picture and sound).

It will be noted that the invention may be implemented between a master digital terminal and several slaves, if the operator so permits.

The invention relates accordingly to a system for receiving broadcast digital data comprising a master digital terminal, and at least one slave digital terminal connected to the master terminal by a link and able to receive protected digital data. According to the invention, the slave digital terminal can access the protected data only if information necessary for accessing said data and received by the master digital terminal is sent by way of said link to the slave digital terminal within a predetermined deadline.

The protected digital data are in particular television services scrambled by keys and the information for accessing the protected data is in particular messages containing access entitlements to the services or else parameters making it possible to extract from such messages data received or else messages containing a part of the access entitlements.

In a particular implementation of the invention, the information necessary for accessing the protected data which is received by the master digital terminal originates from the data broadcasting system.

Advantageously, the information for accessing the data received by the master digital terminal is transformed before being sent to the slave digital terminal.

In another particular implementation, the information necessary for accessing the protected data which is received by the master digital terminal originates from the slave digital terminal and is transformed before being resent to the slave digital terminal.

The transformation operation in the above implementations comprises in particular a descrambling and/or deciphering of the information in the master digital terminal, the descrambling/deciphering being performed with the aid of keys received beforehand by the master digital terminal of the broadcasting system.

According to a particular characteristic of the invention, the predetermined deadline is counted down from the dispatching by the slave digital terminal of a message to the master digital terminal.

According to another characteristic, the predetermined deadline is counted down from the dispatching by the broadcasting system of the data of a message to the master digital terminal.

The invention also relates to a digital terminal intended to receive protected digital data and which can access said protected data only if information necessary for accessing said data and received by another digital terminal to which it can be connected, is sent to it by this other terminal within a predetermined deadline.

The invention further relates to a first digital terminal intended to be connected to a second digital terminal, wherein said first digital terminal is able to receive information necessary for said second terminal to access to protected digital data and is able to dispatch said information to said second terminal.

To summarize, the basic mechanism of the invention is as follows:
- the master digital terminal receives a part of the elements necessary for the descrambling of the services by the slave digital terminal;
- these elements are sent to the slave digital terminal under conditions that are well defined and in a unique manner by way of a physical communication link between the two terminals;
- if the master digital terminal is not able to provide these elements to the slave digital terminal within a predetermined deadline, the slave digital terminal is not capable of accessing the service received.

BRIEF DESCRIPTION OF THE DRAWINGS

The invention will be better understood on reading the detailed description which follows of several embodiments. This description is given merely by way of example and refers to the appended drawings in which.

DESCRIPTION OF THE PREFERRED EMBODIMENTS

Figure 1:
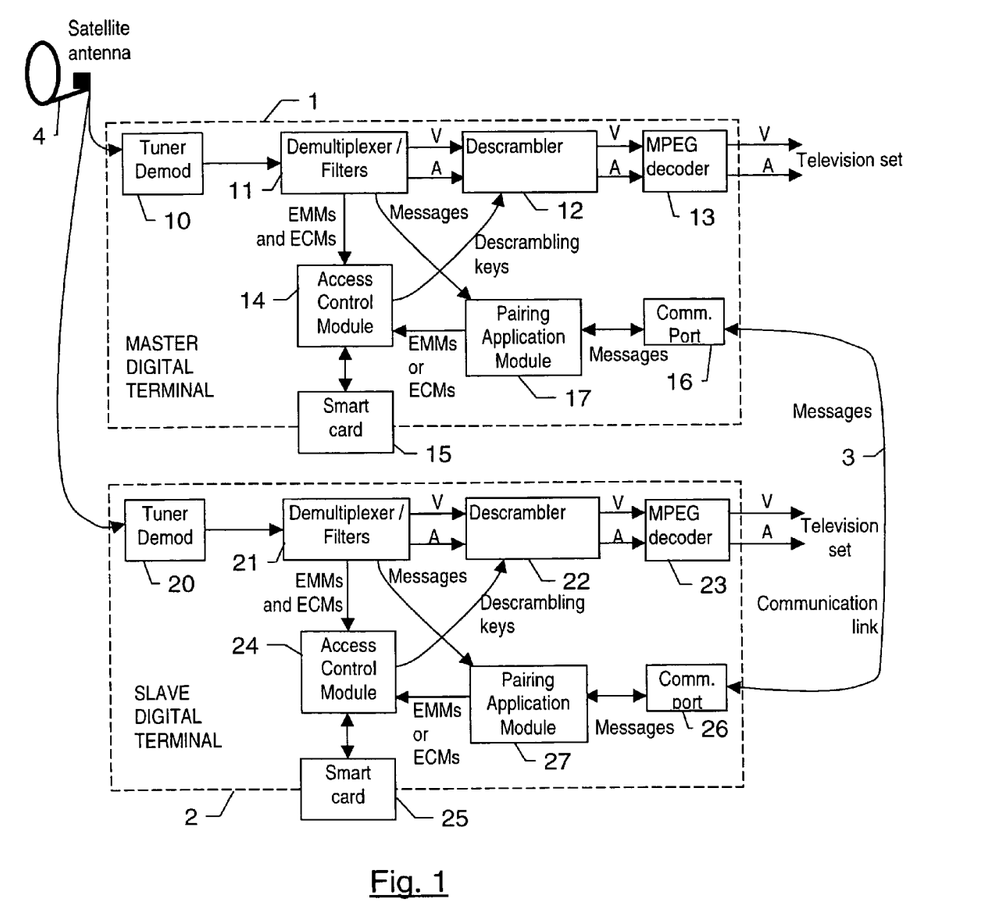
FIG. 1 represents a schematic diagram of a system according to the invention.

In FIG. 1, we have represented two digital terminals (or decoders) a master terminal 1 and a slave terminal 2, which are connected by a communication link 3. The two terminals receive, by way of a satellite antenna 4, digital data broadcast by a service operator, in particular audio/video data. They each comprise a smart card 15/25 inserted into a card reader of the terminal and in which are stored entitlements of the subscriber to access the services (in particular the channels transmitting audio visual programs) of the operator.

The data received are scrambled, according to the conventional principle of pay digital television, by scrambling keys (often called <<control words>>) and the keys are themselves enciphered and sent in messages labeled ECMs (the acronym standing for <<Entitlement Control Message>>) with the service related data. Personalized messages, labeled EMMs (standing for <<Entitlement Management Message>>) make it possible to update on each smart card each subscriber's <<entitlement>> (these entitlements may also be received via a subscriber telephone line to which the terminal is connected, as in the case of <<pay per view>> for example).

To descramble a service to which a subscriber is entitled, the ECMs are dispatched to an access control module 14/24 which, in conjunction with the smart card 15/25, provides the corresponding deciphered descrambling keys, these keys making it possible to descramble the service. The smart card 15/25 actually contains the elements necessary (such as deciphering algorithms and keys) for deciphering the descrambling keys contained in the ECMs messages. The descrambling keys are dynamic and change every 10 seconds at most. This period during which a specific descrambling key is valid for descrambling the data is called the <<key period>> or <<crypto-period>>.

It will be noted that the access control module 14/24 and the smart card 15/25 are merely an exemplary implementation of the access control system in the terminals 1/2. The module 14/24 may be implemented in a detachable module, itself possibly containing a smart card or a secure processor and intended to be plugged into the decoder (for example a module according to the DVB-CI standard, standing for <<Digital Video Broadcasting—Common Interface>> or according to the NRSS-B standard, standing for <<National Renewable Security Standard>>). Likewise, the removable smart card 15/25 can be replaced with a secure processor integrated into the terminal 1/2.

In FIG. 1, the scrambled digital data are received by a tuner/demodulator 10/20 in each terminal 1/2. A demultiplexer and filtering device 11/21 extracts from the data received the ECMs and EMMs messages which are directed to the access control module 14/24. This module 14/24, in conjunction with the card 15/25, deciphers the descrambling keys so as to send them to a descrambler 12/22, which receives the audio/video data A/V from the demultiplexing and filtering module 11/21. By virtue of the descrambling keys received from the module 14/24, the descrambler 12/22 can descramble the A/V data and send them to a decoder, in particular an MPEG decoder 13/23 that outputs audio/video signals in clear for a television set.

According to the invention, a module for managing the pairing application 17/27 is present in the master terminal 1 and in the slave 2. It manages the communications between the two terminals and in particular the transferring of the information from the master terminal to the slave terminal so as to allow the slave terminal to access the data received. This module also controls the deadline that passes before the receipt of this information in such a way as to block the operation of the slave terminal if the information is not received within the fixed deadline. A communication port 16/26 disposed in each terminal manages the link between the two terminals.

Figure 2:
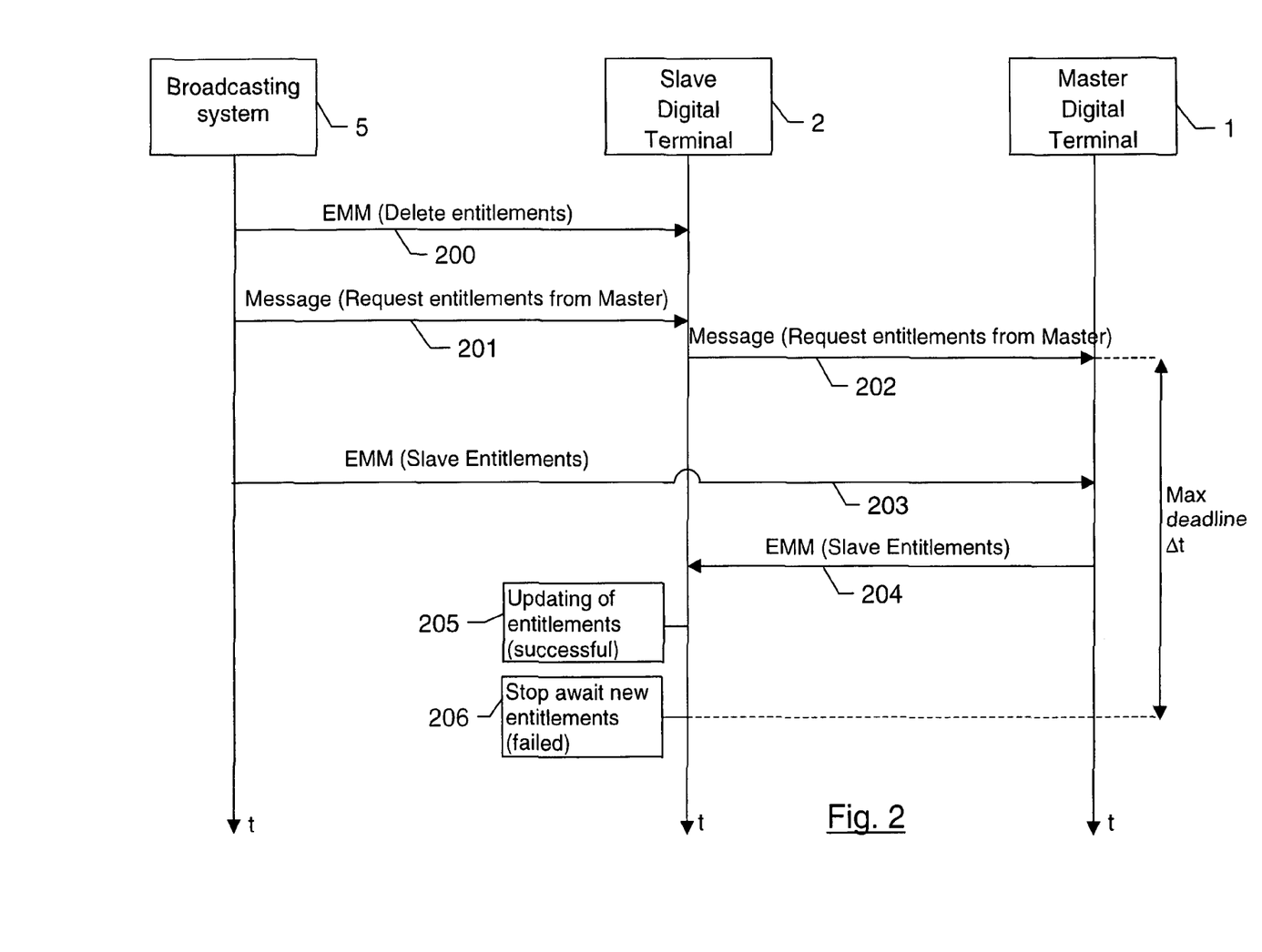
FIG. 2 illustrates a first embodiment of the invention.

FIG. 2 illustrates a first embodiment of the invention, based on the EMMs.

It consists in providing the entitlements (EMMs) of the slave digital terminal 2 by way of the master digital terminal 1 and of the pairing communication link 3, rather than via the satellite antenna 4. In practice, during a first step 200, the slave digital terminal 2 receives from the broadcasting system 5, by satellite, a message <<EMM (Delete entitlements)>> that erases all or part of the entitlements from his smart card 25. Immediately afterwards, during a step 201, it receives an item of information <<Message (Request entitlements from Master)>> that it has to send to the master terminal 1 via the physical link 3 (step 202). The master digital terminal uses this item of information to pick up an EMM sent slightly later (step 203). This message <<EMM (Slave Entitlements)>> is then immediately sent back to the slave digital terminal via the communication link 3 during the step 204. The message <<EMM (Slave Entitlements)>> allows the slave terminal 2 to update its entitlements in its smart card in step 205.

Preferably, the message <<EMM (Slave Entitlements)>> is sent during step 204 while being protected by enciphering. For example, it is assumed that the modules for managing the pairing applications 17 and 27 that are present in the terminals 1 and 2 each possess a secret key shared by the two modules 17 and 27. The module 17 enciphers the message <<EMM (Slave Entitlements)>> with the secret key before dispatching it over the link 3 and the module 27 deciphers it with the secret key when it receives it. This shared secret key may have been received from the broadcasting system 5 in specific EMMs or may have been programmed into the terminals 1 and 2 at the time of their manufacture or when they were brought into service.

According to the principle of the invention, if the response from the master terminal 1 is not received within a due deadline (maximum deadline $\Delta t$), the slave decoder is blocked (step 206), until the next sending of EMMs.

It will be noted that the frequency of sending of the EMMs may be small (one or more days). Moreover, the maximum due deadline $\Delta t$ should be long enough for the digital terminals to have time to process the information and short enough for a delay introduced by an intermediary of Internet Network type to be prohibitive and to block the slave terminal. A deadline $\Delta t$ of the order of a second may for example be suitable.

Figure 3:
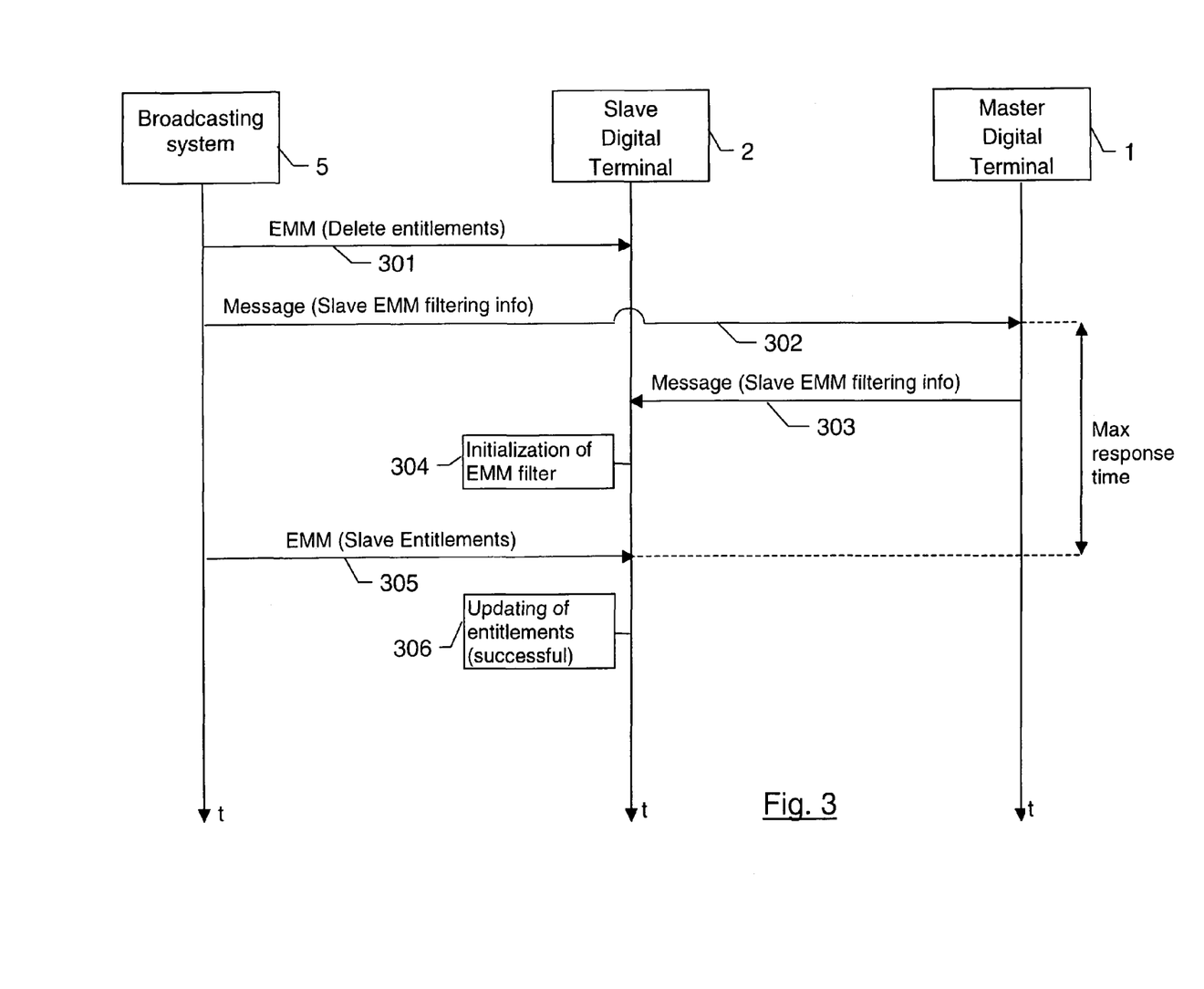
FIG. 3 illustrates a second embodiment of the invention.

FIG. 3 illustrates a second embodiment of the invention, likewise based on the EMMs.

It consists in providing the slave digital terminal 2 with the filtering information for the EMMs by way of the master terminal 1 and of the pairing communication link 3.

During a first step 301, the slave terminal 2 receives from the broadcasting system 5 a message <<EMM (Delete entitlements)>> that cancels all the part of the entitlements of its card 25. Immediately afterwards, during a step 302, the master terminal receives and sends back (step 303) a message containing the filtering parameters for the EMMs <<Message (Slave EMM filtering info)>> of the slave terminal, this information having to be dispatched to the slave terminal via the communication link 3 within a given maximum response time. The slave digital terminal 2 then initializes (step 304) its filters (contained in the Demultiplexer/Filters module 21) with the parameters received. Preferably, the message sent in step 303 is protected by enciphering in the same manner (set forth hereinabove) as that employed to protect the message sent in step 204 of FIG. 2.

When, in step 305, the entitlements (<<(EMM (Slave Entitlements)>>) are then broadcast by the services operator (from the broadcasting system 5) to the slave terminal 2, the latter can, by virtue of the information received from the master terminal, pick up the EMM containing the entitlements of the <<slave>> card 25 and update its entitlements in step 306 so as to continue to operate normally.

If the slave digital terminal 2 has not received the EMM filtering information within the due maximum response time imposed in order for the master terminal to send them back, the entitlements of the slave terminal 2 are not restored, and it no longer operates normally. In practice, the maximum response time is counted down at the level of the broadcasting system 5 between the sending of the <<Message (Slave EMM filtering info)>> and the sending of the message <<EMM (Slave Entitlements)>>. This maximum response time is for example of the order of a second and may vary from one system to another.

Other simple variants may be envisaged: for example the master terminal receives from the broadcasting system 5 a part of the EMM (respectively of the ECM) of the slave terminal then it sends it back to the slave terminal within a limited time span.

Figure 4:
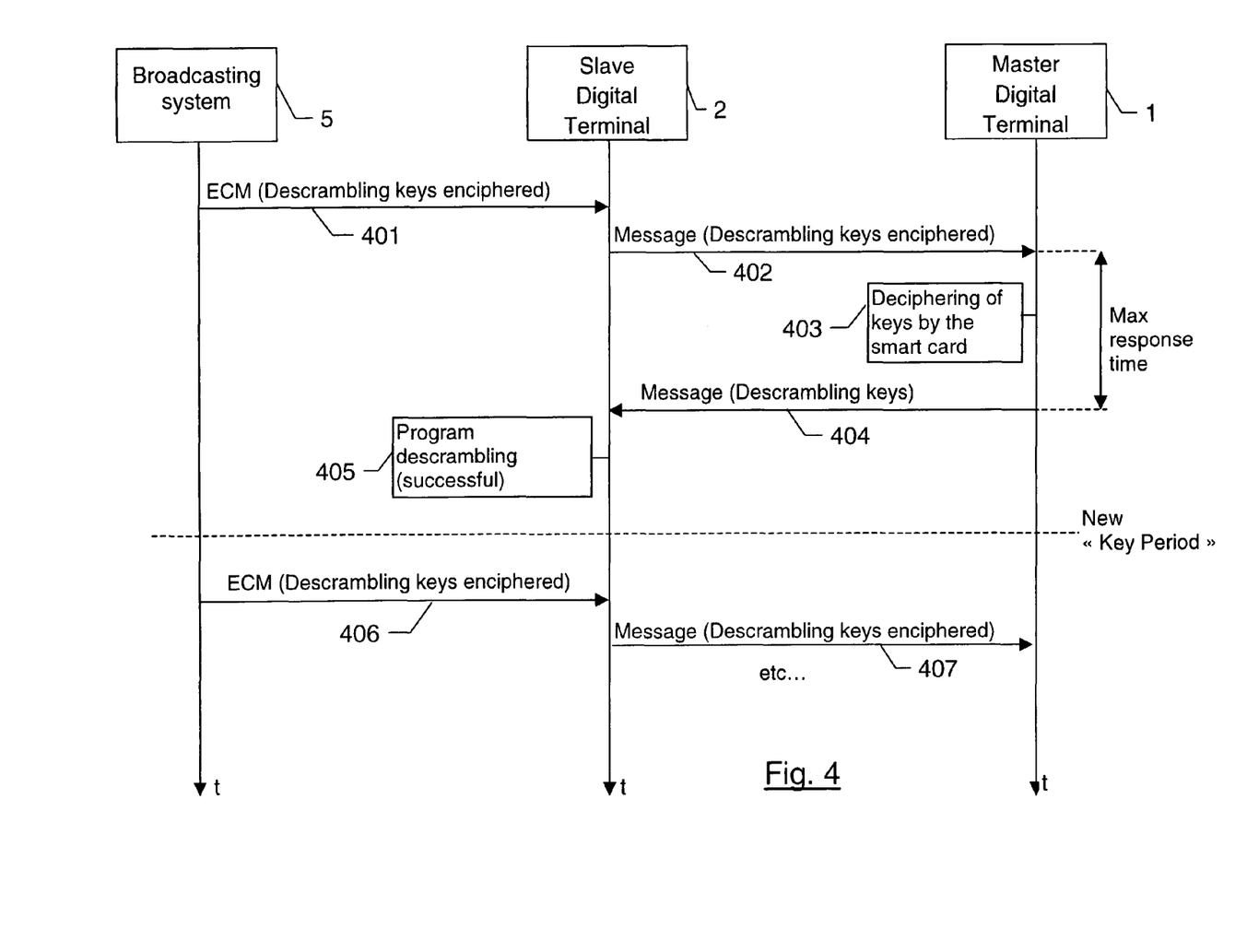
FIG. 4 illustrates a third embodiment of the invention.

FIG. 4 illustrates a third embodiment of the invention, now based on the ECMs rather than on the EMMs.

According to this method, the ECMs containing the descrambling keys necessary for descrambling the audio/video data of the program selected on the slave terminal 2 are not deciphered in the slave terminal (by the access control module 24 in conjunction with the smart card 25), but in the master terminal 1 (by the access control module 14 in conjunction with the smart card 15). The elements (keys and algorithms) necessary for deciphering the descrambling keys are contained only in the master terminal (more precisely in its smart card 15).

In practice, and as illustrated in FIG. 4, when an ECM is received by the slave terminal 2 with the scrambled data stream containing in particular audio visual programs (step 401), the ECM (or just the enciphered descrambling keys that it contains) is immediately dispatched to the master terminal 1 via the physical link 3 (step 402). The descrambling keys are then deciphered in step 403 with the aid of the elements contained in the smart card 15. Then, during step 404, the descrambling keys thus deciphered are returned to the slave terminal 2 which can thus initialize the descrambler 22 for the next crypto-period (or <<key-period>>). The descrambling of the programs can thus take place successfully in step 405.

If on the other hand the deciphered descrambling keys are not received in time by the slave terminal 2, the latter cannot descramble the data containing the programs that it receives.

The operation described above is repeated for each crypto-period (or <<key period>>) and steps 406 and 407 correspond to steps 401 and 402 respectively.

Preferably, the message sent in step 404 containing the deciphered descrambling keys is protected by local enciphering between the master terminal 1 and the slave terminal 2 in the same manner (set forth hereinabove) as that employed to protect the message sent in step 204 of FIG. 2.

A limited time span (labeled <<Max response time>> in FIG. 4), which can vary from one system to another and which is for example of the order of a second, can furthermore be imposed between the dispatching (step 402) by the slave terminal 2 of the messages containing the enciphered descrambling keys to the master terminal 1 and the receipt (step 404) of the deciphered keys by the slave terminal 2. This constraint makes it possible to limit the possibilities of circumvention by Internet.

The implementations described hereinabove involve certain constraints of usage of the master terminal: it must be active and able to receive the EMMs/ECMs/messages permanently, on the one hand since the broadcasting of the information by the broadcasting system is not predictable over time and on the other hand because the broadcasting system has no return of information regarding the fact that these EMMs/ECMs/messages have been received by their intended recipients.

Figure 5:
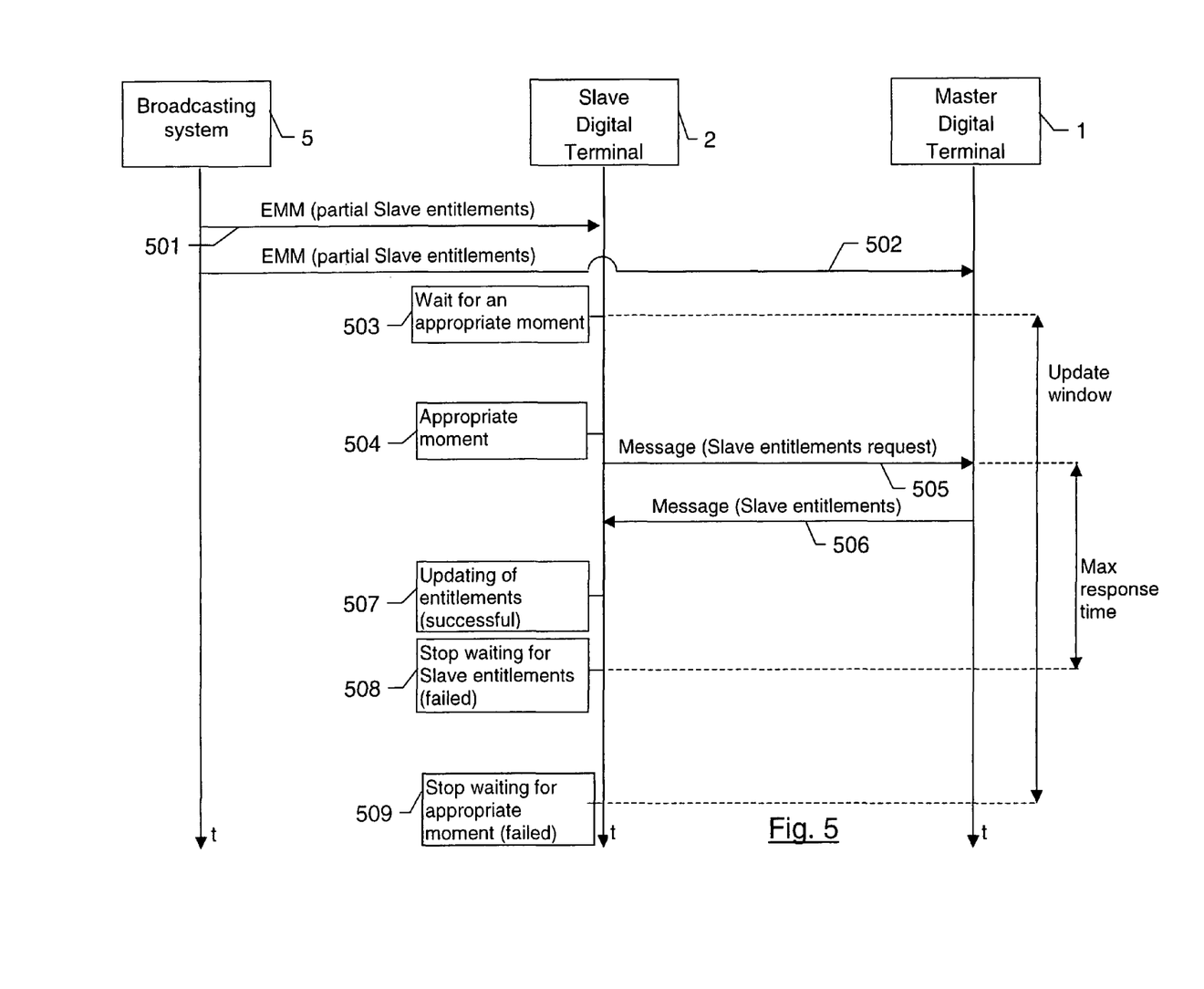
FIG. 5 illustrates a fourth embodiment of the invention.

The fourth embodiment of the invention which follows, illustrated by FIG. 5, makes it possible to reduce these constraints.

According to this embodiment of the invention, all or part of the information allowing the slave terminal 2 to construct its entitlements is received in EMM form that we shall call «EMM (partial Slave entitlements)» and stored by the master terminal 1. The slave terminal 2 will request this information from the master terminal at a subsequent time.

In FIG. 5, in step 501 the slave terminal 2 receives from the broadcasting system 5 an EMM containing part of the information allowing reconstruction of its entitlements and in step 502 the master terminal 1 receives an EMM containing information, complementary to that sent to the slave terminal 2 in step 501, for reconstructing the entitlements of the slave terminal. Naturally, steps 501 and 502 may be performed simultaneously or in a reverse order.

The time at which the exchange of information between the two terminals occurs is preferably chosen in such a way as to guarantee that this exchange will be successful (for example just after having verified that the communication between the two decoders is operational and/or making sure of the presence of the subscriber near his slave terminal so that he can follow any instructions). The step labeled step 503 in FIG. 5 represents this wait for an appropriate moment for transferring the partial entitlements of the slave terminal. The operation of transferring the entitlements must however take place during a limited time interval, corresponding to the «update window» in FIG. 5 (for example a few days) after the arrival of the EMMs, else the software module 27 of the slave terminal cancels the entitlements of its smart card 25.

The appropriate moment having come (step 504), the slave terminal 2 requests the EMM information from the master terminal 1 by dispatching to it a «Message (Slave entitlements request)» during step 505. The master terminal 1 must return this information in the form of a «Message (Slave Entitlements)» (dispatched in step 506 in FIG. 5) within a maximum deadline of a few tens of milliseconds («max response time» in FIG. 5). If the slave's complementary partial entitlements are received within this deadline, then the updating of the entitlements of the slave terminal 2 is performed successfully (step 507). On the other hand, if this information is not received within the «max response time» deadline, the slave terminal ceases waiting for new entitlements (step 508) and the module for managing the pairing application 27 of the slave terminal cancels the entitlements of its smart card 25. Preferably, the message dispatched in step 506 is protected by enciphering as was seen previously for the other exemplary implementations.

When the update window expires without an appropriate moment for the transfer having been detected, the software module 27 of the slave terminal also cancels the entitlements contained in its smart card 25 (step 509).

Figure 6:
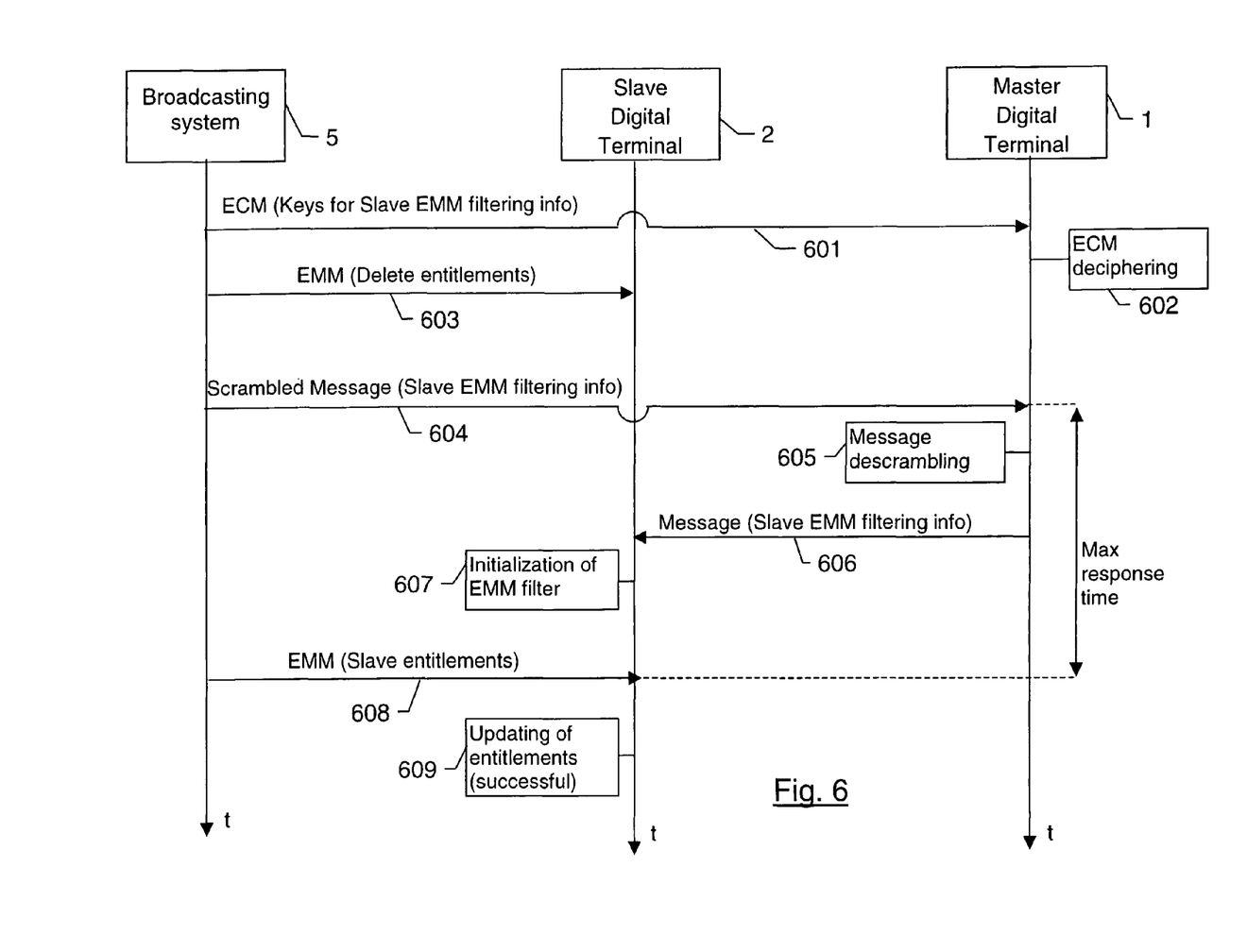
FIG. 6 illustrates a variant of the second embodiment.

The following fifth embodiment of the invention which is illustrated by FIG. 6 makes it possible to reduce a risk related to the possible emulation of the messages dispatched by the master terminal to the slave terminal by an outside device.

The information that is provided to the slave terminal is extracted from the stream broadcast by the broadcasting system by the master terminal. In the first two implementations illustrated by FIGS. 2 and 3, the information received by the master terminal 1 must be transferred to the slave terminal 2 immediately after receipt. A pirate device could be tempted to discover a correlation between the message flowing over the communication link 3 and the content of the broadcast transport stream received by the master terminal in previous instants, and thus be capable of reproducing the scheme for processing the transport stream so as to generate an identical message for the slave terminal within a sufficiently short deadline. This device could be either a computer equipped with a tuner/demodulator/demultiplexer, or the equivalent of another decoder together with suitable software, and be placed in proximity to the slave terminal, far from the master terminal.

To prevent it being possible to find such a correlation, the information received by the master digital terminal 1 must be transformed, according to this preferred implementation of the invention, before being dispatched to the slave terminal 2. The safest means available in a digital terminal for performing this transformation is the use of the DVB descrambler 12/22 in FIG. 1.

In practice, the broadcasting system dispatches a special ECM to the master terminal 1, this special ECM containing a specific descrambling key intended for descrambling a message dispatched subsequently to the master terminal 1. This ECM message is protected in a manner known per se by enciphering. When the ECM is received by the master terminal 1, it is deciphered in a master smart card 15, so as to obtain the specific descrambling key. The message containing the information for the slave terminal 2 is then dispatched to the master terminal 1 in data packets scrambled with the specific key. The master terminal descrambles these data packets with the aid of the specific key received previously. Once descrambled, the packets may be processed by the master terminal 1 so as to generate the message destined for the slave terminal 2.

This method is applicable to all the variant embodiments cited above. In FIG. 6, it is applied to the second embodiment of the invention.

During step 601, the ECM containing specific descrambling keys is dispatched by the broadcasting system 5 to the master terminal 1, then it is deciphered by the master terminal in step 602 to obtain the descrambling keys. Thereafter, steps 603 to 609 are similar to steps 301 to 306 described previously in conjunction with FIG. 3, with the exception of the fact that the message containing the information for filtering the slave EMM, the latter having been dispatched to the master terminal during step 604, is dispatched in data packets scrambled with the aid of the specific keys received previously, then is descrambled during a supplementary step 605 in the master terminal 1. It will also be noted that step 603 that occurs after steps 601 and 602 in FIG. 6 may also take place just before step 601 or between steps 601 and 602.

Figure 7:
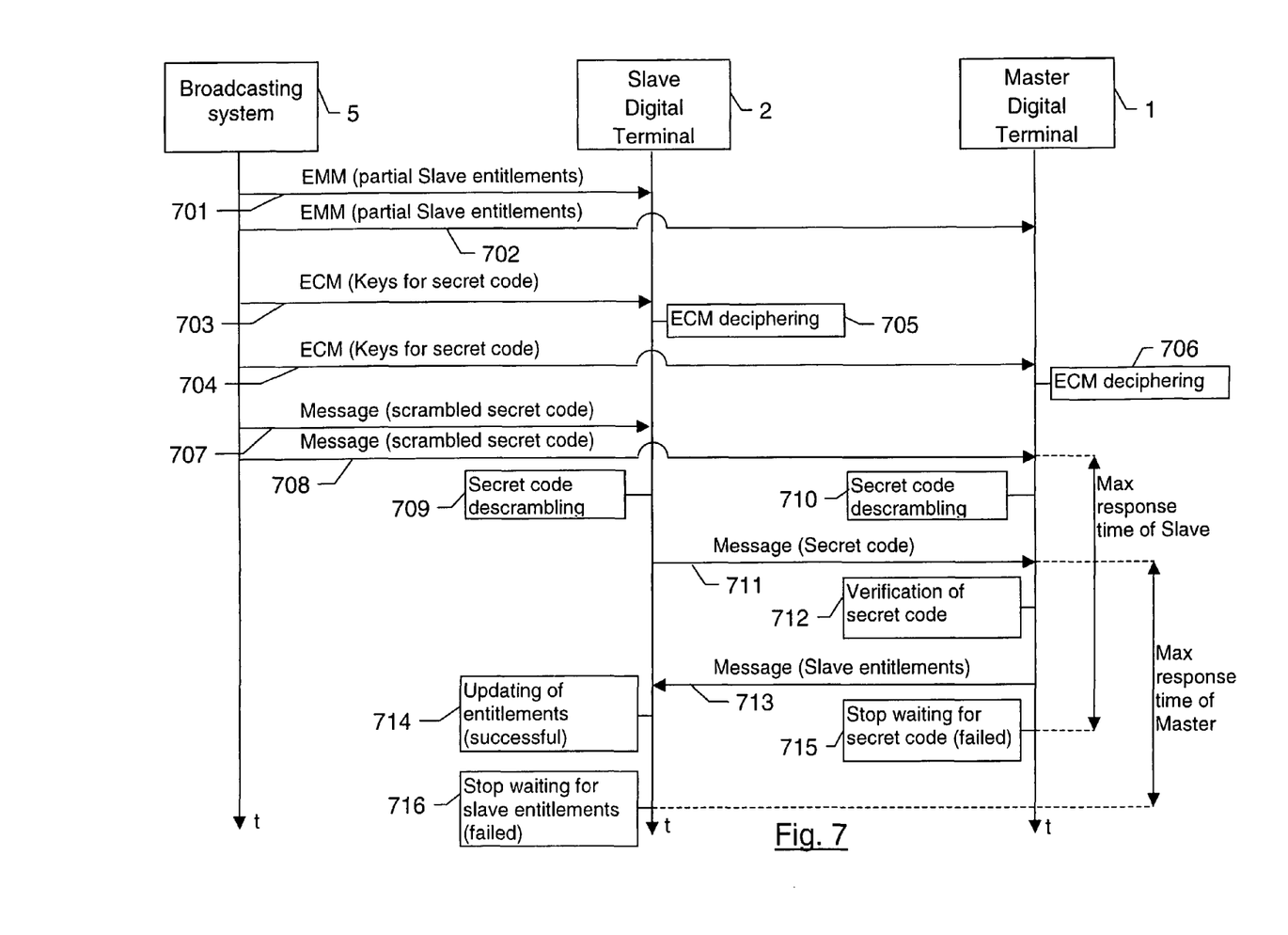
FIG. 7 illustrates a variant of the fourth embodiment.

FIG. 7 illustrates another variant embodiment making it possible to cater for another risk. This risk identified in particular for the fourth type of implementation (described previously in conjunction with FIG. 5) is that of the emulation by an external device of the messages (of the type «Message (Slave entitlements request)») dispatched by the slave terminal 2 to the master terminal 1 so as to retrieve the partial information stored in the master terminal 1 making it possible to reconstruct the entitlements of the slave terminal.

An external device connected to the master terminal could thus emulate the request of the slave terminal and intercept the response of the master terminal. This response could then be dispatched by the Internet to another external device linked to the slave terminal, that could then provide the right information when the slave terminal requests it.

To prevent such emulation, it is possible to propose either the use of a protocol secured with authentication, or more simply to use, as in previous variants, the resources of the smart card and of the broadcasting system.

According to the principle of this variant embodiment, the broadcasting system 5 dispatches at a given moment (here, after having dispatched the EMM messages containing the information making it possible to reconstruct the entitlements of the slave terminal during steps 701 and 702—which correspond to steps 501 and 502 of FIG. 5) to the master terminal 1 and to the slave terminal 2 a special ECM, containing one or more keys for descrambling a secret code. This ECM is dispatched to the slave terminal during a step 703 and to the master terminal during a step 704. The ECM received by each terminal is then deciphered in the smart card 15/25 of each terminal (steps 705 to 706) so as to obtain the key or keys for descrambling the secret code. Next, the broadcasting system 5 dispatches to each of the terminals in steps 707 and 708 an identical message (<<Message (scrambled secret code)>>), scrambled with these previously received keys. The messages containing the secret code are descrambled in each terminal 1/2 with the aid of the smart cards 15/25 and of the descrambler 12/22 during step 709 and 710. The slave terminal 2 then dispatches to the master terminal 1 a message containing the secret code obtained (step 711).

The master terminal 1 waits for this message for a limited time span indicated in FIG. 7 by <<max response time of the Slave>>. If it receives it in time, it verifies during a step 712 that it is indeed the secret code expected by comparing it with that which it has itself received, then, in case of positive verification, it responds by dispatching to the slave terminal 2 a message containing the information necessary for reconstructing the entitlements of the slave terminal (step 713). The slave terminal 2 can then update its entitlements on its smart card 25 successfully (step 714). If the master terminal 1 has not received the expected message containing the secret code within the due time (step 715) or if the message received from the slave terminal 2 does not contain the secret code that the master terminal has received beforehand from the broadcasting system 5, it does not dispatch the information to reconstruct the entitlements of the slave.

Once its message has been dispatched, the slave terminal 2 likewise waits for the response of the master terminal 1 for a limited time span indicated in FIG. 7 by <<max response time of the Master>>. If the information does not arrive within the due deadlines (step 716), then the slave terminal 2 does not update the entitlements of its smart card.

Such a device therefore makes it possible, on the one hand to render the exchange of information unpredictable, and on the other hand imposes the real-time constraint that prevents potential circumvention by Internet.

In another variant, it is also possible to use the principle described in FIG. 7 in an implementation other than that consisting in dispatching EMMs containing partial information for reconstructing the entitlements of the slave terminal. Provision may in particular be made, at regular intervals (for example, each week or each day), for the broadcasting system 5 to dispatch ECMs messages such as those dispatched in steps 703 and 704 to the master terminal 1 and to the slave terminal 2. Steps 707 to 712 run in the same manner as in FIG. 7, then, in case of positive verification the secret code in step 712, the master terminal dispatches a message signifying that the code received is correct. If this message is received after the expiry of the <<max response time of the Master>> or if the code received is not correct, provision is made in this case for the slave terminal itself to delete the entitlements contained in its smart card 25.

The invention is not limited to the embodiments described hereinabove. Another variant may in particular be envisaged in the embodiments illustrated in FIGS. 2, 3 and 6. In all these embodiments, it is possible, instead of dispatching a message <<EMM (Delete entitlements)>> at the start of the protocol so as to erase the entitlements of the slave terminal, to wait for the end of the protocol and, if the predetermined deadline has passed without the slave terminal having received the necessary information from the master terminal, then provision may be made for the slave terminal itself to delete its entitlements (for example by erasing them from its smart card 25).

The advantages of the invention are as follows: since it is based on security elements of the broadcasting system itself (the information exchanged between the terminals is enciphered with secrets managed by the data broadcasting system and by the smart cards of the digital terminals), the risk of piracy at the level of the smart card or of the digital terminal is reduced.

Moreover, since the invention may relay on the "real time" aspect of the implementation, the risk of prolongation of the physical link between two digital terminals by telephone or Internet network is considerably reduced. Specifically, the physical link between the two digital terminals master and slave could be "lengthened" indefinitely by an Internet link: the service operator would then no longer have the guarantee that the two terminals in the same household of a subscriber. By imposing, according to the principle of the invention, a maximum deadline for the transferring of the data, one thus ensures that the information does not travel via an Internet type link.

Another advantage of the invention is that it guarantees that each exchange of data is different from the previous one, and hence unpredictable. Specially, a pirate could be tempted to spy on the information which is received by the terminals so as to emulate the information expected on the part of the master digital terminal by the slave digital terminal with the aid of a pirate device (a computer for example). Since the information that is exchanged between the terminals changes with each communication, it is unpredictable and cannot therefore be easily emulated by a pirate device.

The invention claimed is:

1. System for receiving broadcast digital data comprising:
   a master digital terminal and at least one slave digital terminal adapted to generally simultaneously receive protected digital data from a transmitter, the at least one slave digital terminal being connected to the master terminal by a link,
   wherein said at least one slave digital terminal is adapted to receive a message from the transmitter instructing said at least one slave digital terminal to delete stored information necessary for accessing said protected digital data, to request, after receiving the message, from the master digital terminal new information necessary for accessing said protected digital data, and await the new information until an expiration of a predetermined deadline counted from a transmission of the request.

2. System according to claim 1, wherein the information necessary for accessing the protected data which is received by the master digital terminal originates from a data broadcasting system.

3. System according to claim 2, wherein said information for accessing the data received by the master digital terminal is transformed before being sent to the slave digital terminal.

4. System according to claim 3, in which the transformation comprises a descrambling of said information in the master digital terminal, the descrambling being performed with the aid of keys received beforehand by the master digital terminal of the broadcasting system.

5. System according to claim 1, wherein the information necessary for accessing the protected data, which is received by the master digital terminal originates from the slave digital terminal, is transformed before being resent to the slave digital terminal.

6. System according to claim 5, in which the transformation comprises a descrambling of said information in the master digital terminal, the descrambling being performed with the aid of keys received beforehand by the master digital terminal of the broadcasting system.

7. System according to claim 1, in which the protected digital data comprise television services scrambled by keys and in which the information necessary for accessing said data belongs to the set comprising:
a message containing access entitlements to the services for the slave digital terminal;
a message containing parameters for extracting from the data stream received by the slave digital terminal a message containing access entitlements to the services for the slave digital terminal;
a message containing partial information enabling the slave digital terminal to reconstruct its access entitlement to the services;
a message containing keys for descrambling said protected digital data.

8. System according to claim 1, in which the predetermined deadline is counted down from the dispatching by the broadcasting system of the data of a message to the master digital terminal.

9. System according to claim 1, in which the information necessary for accessing the protected data is sent from the master digital terminal to the slave digital terminal while being protected by enciphering using a key shared by the two terminals.

10. System according to claim 1,
in which the master digital terminal and slave digital terminal furthermore receive from the data broadcasting system a secret code and
in which the master digital terminal sends said information necessary for accessing the data to the slave terminal only if it receives said secret code from the slave terminal within a second predetermined deadline counting from the receipt of the secret code by the master terminal.

11. System according to claim 10, in which the secret code received by the master digital terminal and by the slave digital terminal is scrambled with the aid of keys sent beforehand to said terminals by the data broadcasting system.

12. System according to claim 1, wherein the information necessary for accessing said protected data comprises a secret key.

13. System according to claim 1, wherein the protected digital data is received via another link.

14. System according to claim 1, wherein the slave decoder is adapted to block by longer accepting the information necessary for accessing said protected digital data from the master decoder.

15. System according to claim 1, wherein the information necessary for accessing is subject to a validity period, and wherein the predetermined deadline is equal to a second while the validity period is one or more days.

16. System of claim 1, wherein the predetermined deadline is such that a delay introduced by an intermediary is prohibitive.

17. A digital terminal intended to receive protected digital data from a transmitter generally simultaneously with a second digital terminal, wherein the digital terminal is adapted to receive a message from the transmitter instructing the digital terminal to delete stored information necessary for accessing said data and received by the second digital terminal to which it can be connected, to request, after receiving the message, from the second digital terminal new information necessary for accessing said protected digital data, and await the new information until an expiration of a predetermined deadline counted from a transmission of the request.

18. Digital terminal according to claim 17, wherein the information necessary for accessing said protected data comprises a secret key.

19. Digital terminal according to claim 17, wherein the protected digital data is received via another link.

20. System for receiving broadcast digital data, comprising:
a master digital terminal and at least one slave digital terminal adapted to generally simultaneously receive protected data from a transmitter, the at least one slave digital terminal being connected to the master terminal by a link,
wherein said slave digital terminal can access said received protected digital data only if information necessary for accessing said protected digital data and received by the master digital terminal is sent by way of said link to the slave digital terminal within a predetermined deadline,
wherein the information necessary for accessing said protected digital data comprises filter parameters for extracting from the data stream received by the slave digital terminal a message containing access entitlements to the services for the slave digital terminal, and
wherein the at least one slave digital terminal comprises filters that use the filter parameters to extract the message containing the access entitlements.

21. System of claim 20, wherein the slave digital terminal decrypts the extracted message containing the access entitlements.

22. A digital terminal intended to receive protected digital data from a transmitter generally simultaneously with a second digital terminal, wherein the digital terminal can access said received protected digital data only if information necessary for accessing said data and received by the second digital terminal to which it can be connected, is not received from this other terminal within a predetermined deadline,
wherein the information necessary for accessing said protected digital data comprises filter parameters for extracting from the data stream received by the slave digital terminal a message containing access entitlements to the services for the slave digital terminal, and
wherein the slave digital terminal comprises filters that use the filter parameters to extract the message containing the access entitlements.

23. System for receiving broadcast digital data comprising:
a master digital terminal and at least one slave digital terminal adapted to generally simultaneously receive protected digital data from a transmitter, the at least one slave digital terminal being connected to the master terminal by a link,
wherein said slave digital terminal is adapted to receive from the transmitter a first part of an Entitlement Management message necessary for accessing said protected digital data, to receive from the master terminal a second part of the Entitlement Management Message necessary for accessing said protected digital data provided that it is received from the master digital terminal within a predetermined deadline, wherein the first part and the second part of the Entitlement Management Message enable accessing at least one decryption key for the protected digital data.

* * * * *